US012139034B2

(12) United States Patent
Diamond et al.

(10) Patent No.: US 12,139,034 B2
(45) Date of Patent: Nov. 12, 2024

(54) SYSTEMS AND METHODS FOR PROVIDING PREEMPTIVE VEHICLE REENERGIZING ALERTS

(71) Applicant: FORD GLOBAL TECHNOLOGIES, LLC, Dearborn, MI (US)

(72) Inventors: Brendan Francis Diamond, Grosse Pointe, MI (US); Lars Niklas Pettersson, Novi, MI (US); Keith Weston, Canton, MI (US); Jordan Barrett, Milford, MI (US); Andrew Denis Lewandowski, Sterling Heights, MI (US); Michael Alan McNees, Flat Rock, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 156 days.

(21) Appl. No.: 17/487,230

(22) Filed: Sep. 28, 2021

(65) Prior Publication Data

US 2023/0094216 A1   Mar. 30, 2023

(51) Int. Cl.
*B60L 53/63* (2019.01)
*B60L 53/66* (2019.01)
*B60L 53/68* (2019.01)
*G01W 1/00* (2006.01)
*G06N 3/02* (2006.01)

(52) U.S. Cl.
CPC ............ *B60L 53/63* (2019.02); *B60L 53/665* (2019.02); *B60L 53/68* (2019.02); *G01W 1/00* (2013.01); *G06N 3/02* (2013.01); *B60L 2240/66* (2013.01); *G01W 2203/00* (2013.01)

(58) Field of Classification Search
CPC ........ B60L 53/63; B60L 53/665; B60L 53/68; B60L 2240/66; G01W 1/00; G01W 2203/00; G06N 3/02
See application file for complete search history.

(56) References Cited

U.S. PATENT DOCUMENTS

| | | | |
|---|---|---|---|
| 9,297,723 B1 | 3/2016 | Hofmann et al. | |
| 10,906,425 B2 | 2/2021 | Herman et al. | |
| 2010/0010857 A1* | 1/2010 | Fadell | G06Q 50/06 705/412 |

(Continued)

FOREIGN PATENT DOCUMENTS

JP    2011196826 A    10/2011

*Primary Examiner* — Santosh R Poudel
(74) *Attorney, Agent, or Firm* — David B. Kelley; Carlson, Gaskey & Olds, P.C.

(57) ABSTRACT

Systems and methods may be configured for providing preemptive reenergizing alerts designed to alert vehicle users to reenergize their vehicles in anticipation of power disruption conditions. Weather related data and/or grid related data may be leveraged for predicting the likelihood of power disruption conditions of a grid power source. When power disruption conditions are likely to increase the cost of energy by greater than a predefined threshold, one or more reenergizing alerts may be automatically communicated for alerting the users of the need to reenergize (e.g., refuel, recharge, etc.) their vehicles. Preemptively alerting users to reenergize their vehicles in this manner may ensure that the vehicle will be available for use as a backup power source during actual power disruption conditions.

17 Claims, 6 Drawing Sheets

(56) References Cited

U.S. PATENT DOCUMENTS

| | | | |
|---|---|---|---|
| 2010/0057306 A1* | 3/2010 | Ishii | B60L 50/16 |
| | | | 701/48 |
| 2011/0282511 A1* | 11/2011 | Unetich | G06Q 50/06 |
| | | | 700/297 |
| 2013/0015703 A1* | 1/2013 | Rouse | H02J 3/06 |
| | | | 307/18 |
| 2014/0074752 A1* | 3/2014 | Ouimet | G06Q 40/06 |
| | | | 705/36 R |
| 2016/0086292 A1 | 3/2016 | Satomi et al. | |
| 2017/0316349 A1* | 11/2017 | Cruickshank, III | G06Q 10/00 |
| 2018/0048150 A1* | 2/2018 | Frasher | H02J 3/00 |
| 2018/0252178 A1* | 9/2018 | Payne | B60W 20/00 |
| 2019/0385182 A1 | 12/2019 | Price et al. | |
| 2020/0101850 A1* | 4/2020 | Harty | B60L 55/00 |
| 2020/0175534 A1* | 6/2020 | Aggarwala | G01W 1/02 |
| 2022/0060017 A1* | 2/2022 | Lewin | H02J 3/003 |
| 2022/0292445 A1* | 9/2022 | Nakajima | B65G 61/00 |

* cited by examiner

SYSTEMS AND METHODS FOR PROVIDING PREEMPTIVE VEHICLE REENERGIZING ALERTS

TECHNICAL FIELD

This disclosure is directed to systems and methods adapted for providing preemptive alerts designed to inform vehicle users to reenergize their vehicles in anticipation of power disruption conditions that are likely to significantly raise energy prices.

BACKGROUND

Motor vehicles include power sources for powering the drive wheels of the vehicles. For example, conventional motor vehicles include internal combustion engines that act as the vehicle power source, and electrified vehicles include traction battery pack powered electric machines that act as the vehicle power source. The energy storage system that supply energy to these power sources must be periodically reenergized (e.g., refueled or recharged) to replenish the energy levels necessary for propelling the vehicles.

SUMMARY

A preemptive vehicle reenergizing system according to an exemplary aspect of the present disclosure includes, among other things, an energy storage system and a control module programmed to command an alert for reenergizing the energy storage system in response to predicting that a power disruption condition of a grid power source is likely to raise a cost of energy purchased from the grid power source by greater than a predefined threshold.

In a further non-limiting embodiment of the foregoing system, the energy storage system includes a traction battery pack or a fuel tank system.

In a further non-limiting embodiment of either of the foregoing systems, the control module is programmed to predict that the power disruption condition is likely based on weather related data received from a weather data server.

In a further non-limiting embodiment of any of the foregoing systems, the control module is programmed to predict that the power disruption condition is likely based on data received from a grid announcement server associated with the grid power source.

In a further non-limiting embodiment of any of the foregoing systems, the control module is a component of a motor vehicle that is powered by the energy storage system.

In a further non-limiting embodiment of any of the foregoing systems, the control module is programmed to communicate with a neural network for determining whether the power disruption condition is likely to raise the cost of the energy by greater than the predefined threshold.

In a further non-limiting embodiment of any of the foregoing systems, the predefined threshold is defined as a percentage increase of the cost.

In a further non-limiting embodiment of any of the foregoing systems, the percentage is at least 10%.

In a further non-limiting embodiment of any of the foregoing systems, the alert for reenergizing the energy storage system includes one or more messages presented on a human machine interface (HMI) or a personal electronic device associated with the preemptive vehicle reenergizing system.

In a further non-limiting embodiment of any of the foregoing systems, the one or more messages includes an instruction to reenergize the energy storage system, an estimate of when the power disruption condition is likely to take effect, an estimate of how long the power disruption condition is likely to last, or an estimate of the cost of reenergizing the energy storage system both before and after the power disruption condition takes effect.

A method according to another exemplary aspect of the present disclosure includes, among other things, predicting, via a control module of a preemptive vehicle reenergizing system, when a power disruption condition is likely to raise a cost of energy purchased from a grid power source by greater than a predefined threshold, and communicating an alert for reenergizing a vehicle energy storage system in response to the predicting.

In a further non-limiting embodiment of the foregoing method, the control module is a component of a motor vehicle associated with the preemptive vehicle reenergizing system.

In a further non-limiting embodiment of either of the forgoing methods, the predicting includes receiving weather related data from a weather data server and predicting whether the power disruption condition is likely based on the weather related data.

In a further non-limiting embodiment of any of the foregoing methods, the predicting includes communicating with a neural network for determining whether the power disruption condition is likely to raise the cost of the energy by greater than the predefined threshold.

In a further non-limiting embodiment of any of the foregoing methods, the predicting includes receiving data from a grid announcement server associated with the grid power source and predicting whether the power disruption condition is likely based on the data from the grid announcement server.

In a further non-limiting embodiment of any of the foregoing methods, the method includes commanding an autonomous vehicle associated with the preemptive vehicle reenergizing system to drive to a nearby charging/refueling station when the power disruption condition is likely to raise the cost of the energy by greater than the predefined threshold.

In a further non-limiting embodiment of any of the foregoing methods, the communicating includes displaying a message to a user on a human machine interface or a personal electronic device that is operably linked to the preemptive vehicle reenergizing system.

In a further non-limiting embodiment of any of the foregoing methods, the message includes an estimate of a cost that can be incurred by not reenergizing the energy storage system until after the power disruption condition occurs.

In a further non-limiting embodiment of any of the foregoing methods, the message includes an estimate of when the power disruption condition is likely to take effect and how long the power disruption condition is likely to last.

In a further non-limiting embodiment of any of the foregoing methods, the predefined threshold is defined as a percentage increase of the cost.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the

DETAILED DESCRIPTION

This disclosure relates to systems and methods for providing preemptive reenergizing alerts designed to alert vehicle users to reenergize their vehicles in anticipation of power disruption conditions. Weather related data and/or grid related data may be leveraged for predicting the likelihood of power disruption conditions of a grid power source. When power disruption conditions are likely to increase the cost of energy by greater than a predefined threshold, one or more reenergizing alerts may be automatically communicated for alerting the users of the need to reenergize (e.g., refuel, recharge, etc.) their vehicles. Preemptively alerting users to reenergize their vehicles in this manner may ensure that the vehicle will be available for use as a backup power source during actual power disruption conditions. These and other features of this disclosure are discussed in greater detail in the following paragraphs of this detailed description.

Figure 1:
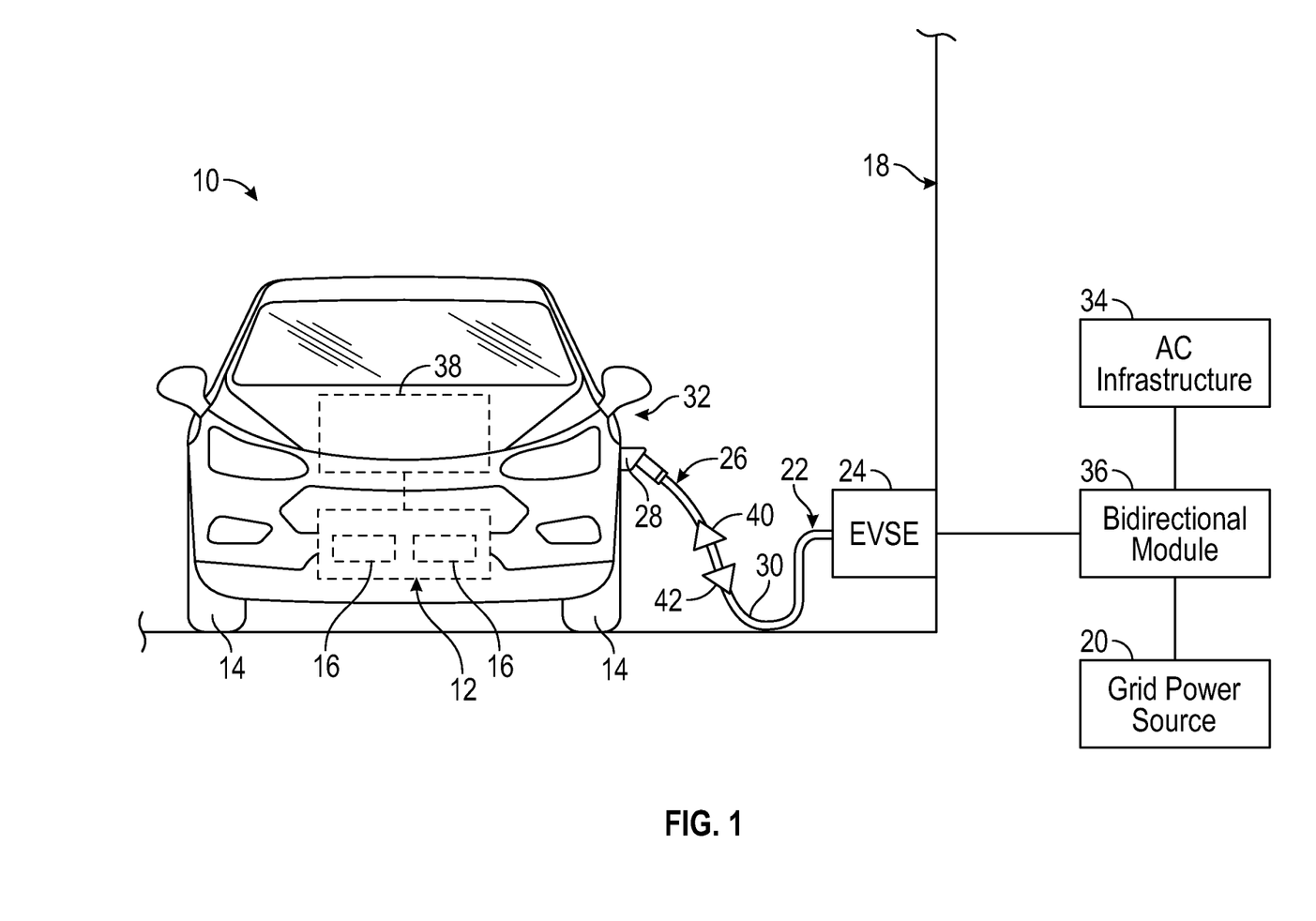
FIG. 1 schematically illustrates a motor vehicle equipped with an energy storage system for powering a vehicle power source.

FIG. 1 schematically illustrates a motor vehicle 10 equipped with an energy storage system 12 for supplying energy for powering the propulsion of the vehicle 10. In an exemplary embodiment, the vehicle 10 is an electrified vehicle, and the energy storage system 12 is a traction battery pack. The vehicle 10 may be an all-electric vehicle or a hybrid electric vehicle in which power from an electric motor is utilized to drive one or more drive wheels 14 of the vehicle 10 either with or without the assistance of an internal combustion engine. This disclosure also extends to motor vehicles that are solely driven by an internal combustion engine that acts as the vehicle's power source.

The vehicle 10 of FIG. 1 is schematically illustrated as a car. However, the teachings of this disclosure may be applicable to any type of vehicle, including but not limited to, cars, trucks, vans, sport utility vehicles (SUVs), etc. Moreover, although a specific component relationship is illustrated in the figures of this disclosure, the illustrations are not intended to limit this disclosure. The placement and orientation of the various components of the depicted vehicle are shown schematically and could vary within the scope of this disclosure. In addition, the various figures accompanying this disclosure are not necessarily drawn to scale, and some features may be exaggerated or minimized to emphasize certain details of a particular component.

In implementations in which the energy storage system 12 is a traction battery pack, the energy storage system 12 may be a high voltage traction battery pack that includes a plurality of battery arrays 16 (e.g., battery assemblies or groupings of battery cells) capable of outputting electrical power to the one or more electric machines (e.g., electric motors). Other types of energy storage devices and/or output devices can also be used to electrically power the vehicle 10.

The energy storage system 12 may periodically require charging for replenishing its energy levels. Charging is an example of reenergizing the energy storage system 12. The vehicle 10 may interface with a grid power source 20 (e.g., AC power, solar power, wind power, or combinations thereof) through an electric vehicle supply equipment (EVSE) system 22 in order to transfer energy from the grid power source 20 to the vehicle 10 for reenergizing the energy storage system 12, for example.

The EVSE system 22 may be located at a structure 18. The structure 18 may be a residential building, a commercial building, a parking garage, a charging station, or any other type of structure that is capable of receiving or transferring energy. In an embodiment, the structure 18 is a garage of a residential household that functions as a "home location" of the vehicle 10.

The EVSE system 22 may include an EVSE housing 24 and a charging cord assembly 26. The EVSE housing 24 may be configured as a wall box, a charging station stanchion, etc. The specific configuration of the EVSE housing 24 is not intended to limit this disclosure.

The charging cord assembly 26 may include one or more charge couplers 28 and a cable 30. The cable 30 may be connected at one end to the charge coupler 28 and at an opposite end to the EVSE housing 24 or to another charge coupler. The charge coupler 28 may be coupled (e.g., plugged-in) to a charge port assembly 32 (sometimes referred to as a vehicle inlet assembly) of the vehicle 10 in order to transfer energy from the grid power source 20 to the vehicle 10. The EVSE system 22 may be configured to provide any level of charging (e.g., Level 1 AC charging, Level 2 AC charging, DC fast charging, etc.) within the scope of this disclosure.

The EVSE system 22 may be operably connected to an AC infrastructure 34 of the structure 18 through a bidirectional energy transfer module 36. Although shown separately from the EVSE system 22 in FIG. 1, the bidirectional energy transfer module 36 and the EVSE housing 24 could be integrated together as part of common module. Various electrical loads, such as common household loads, for example, may be associated with the AC infrastructure 34.

Power from the grid power source 20 and/or power from the vehicle 10 may be communicated to the bidirectional energy transfer module 36. The bidirectional energy transfer module 36 may be configured to aid the establishment of bidirectional transfers of electrical energy between the vehicle 10 and the structure 18. The bidirectional energy transfer module 36 may include various equipment, including but not limited to an DC/AC inverter, a common HVDC bus, an isolation transformer, a DC/DC converter, a control module, etc. for configuring the structure 18 to either receive electrical energy from the vehicle 10 or send electrical energy to the vehicle 10. The bidirectional energy transfer module 36 may further be configured to transfer energy from the grid power source 20 to the AC infrastructure 34.

The vehicle 10 may include a bidirectional power transfer system 38 configured for further enabling the bidirectional transfer of power between the vehicle 10 and the structure 18. The bidirectional power transfer system 38 may be operably connected between the charge port assembly 32 and the energy storage system 12 of the vehicle 10. The bidirectional power transfer system 38 may include various equipment, such as a charger, an inverter, a converter, a motor controller (which may be referred to as an inverter system controller or ISC), etc. for configuring the vehicle 10 for either receiving electrical energy from the structure 18 or communicating electrical energy to the structure 18. The bidirectional power transfer system 38 may additionally be configured to transfer energy between the energy storage system 12 and the one or more electric motor(s) of the vehicle 10.

During a first energy transfer configuration, power may be transferred from the structure 18 to the vehicle 10, such as for reenergizing the energy storage system 12 of the vehicle 10. The direction of energy transfer during the first energy transfer configuration is schematically depicted by arrow 40.

During a second energy transfer configuration, power may be transferred from the energy storage system 12 of the vehicle 10 to the structure 18. The direction of energy transfer during the second configuration is schematically illustrated by arrow 42. When so equipped, the vehicle 10 may be employed as a backup energy storage system for powering electrical loads of the AC infrastructure 34 when power from the grid power source 20 is temporarily unavailable or too expensive, such as during certain types of power disruption conditions, for example.

In other implementations in which the vehicle 10 is configured as a conventional motor vehicle, the energy storage system 12 may be a fuel tank system for storing fuel (e.g., gasoline, diesel, etc.) that may be used to power an internal combustion engine of the vehicle 10.

Power disruption conditions refer to conditions in which power from grid power source 20 is temporality unavailable for any reason (blackouts, planned outages, etc.). Power disruption conditions can leave many users without power and/or increase the costs associated with purchasing electricity from the grid power source 20 to relatively high levels. In many cases, users are unable to appreciate or are simply oblivious to events that are likely to result in power disruption conditions and any associated energy cost surges. This disclosure is therefore directed to systems and methods for providing preemptive alerts designed to inform vehicle users to reenergize their vehicles in anticipation of certain types of power disruption conditions.

Figure 2:
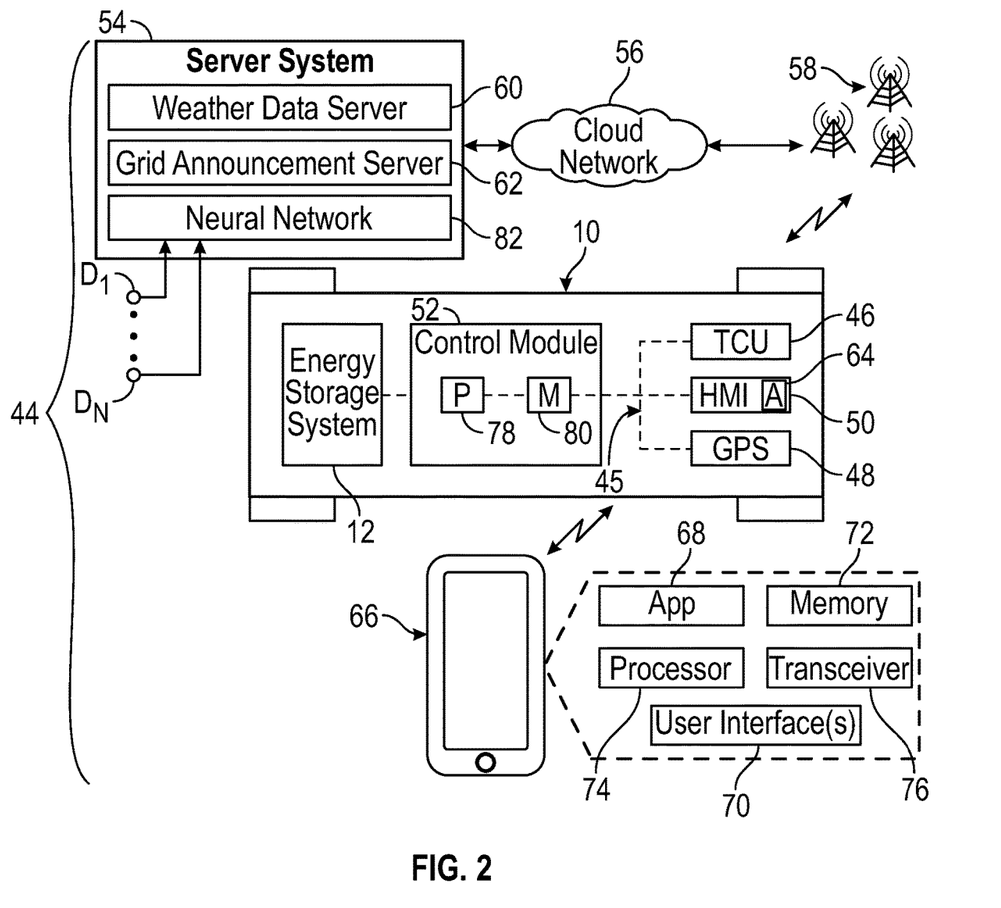
FIG. 2 schematically illustrates a preemptive vehicle reenergizing system of the vehicle of FIG. 1.

FIG. 2, without continued reference to FIG. 1, is a highly schematic depiction of a preemptive vehicle reenergizing system 44 of the vehicle 10. The preemptive vehicle reenergizing system 44 may be configured to both predict when power disruption conditions of the grid power source 20 are likely to occur and preemptively communicate an alert to the user of the vehicle 10 when the predicted power disruption condition is likely to raise a cost associated with purchasing electricity from the grid power source 20 by greater than a predefined threshold. The alert indicates to the user that reenergizing the energy storage system 12 may be advisable.

As part of the preemptive vehicle reenergizing system 44, the vehicle 10 may include a telecommunications module 46, a global positioning system (GPS) 48, a human machine interface (HMI) 50, and a control module 52. These and other components may be interconnected and in electronic communication with one another over a communication bus 45 of the vehicle 10. The communication bus 45 may be a wired communication bus such as a controller area network (CAN) bus, or a wireless communication bus such as Wi-Fi, Bluetooth®, Ultra-Wide Band (UWB), etc.

The telecommunications module 46 may be configured for achieving bidirectional communications with a cloud-based server system 54. The telecommunications module 46 may communicate over a cloud network 56 (e.g., the internet) to obtain various information stored on the server system 54 or to provide information to the server system 54 that can subsequently be accessed by the vehicle 10 (and/or other participating users). The server system 54 can identify, collect, and store user data associated with the vehicle 10 for validation purposes. Upon an authorized request, data may be subsequently transmitted to the telecommunications module 46 via one or more cellular towers 58 or some other known communication technique (e.g., Wi-Fi, Bluetooth®, data connectivity, etc.). The telecommunications module 46 can receive data from the server system 54 or can communicate data back to the server system 54 via the cellular tower(s) 58. Although not necessarily shown or described in this highly schematic embodiment, numerous other components may enable bidirectional communications between the vehicle 10 and the server system 54.

The server system 54 may include various servers that store data that may be accessed by the preemptive vehicle reenergizing system 44 in anticipation of providing preemptive reenergizing alerts. In an embodiment, the server system 54 includes a weather data server 60 that stores weather related data. The weather related data may include, but is not limited to, weather history including historic weather data including storm information that has caused power outages in the past, region specific events and storm profiling including types of energy generation typically used for a given locational area, storm metrics including current and forecasted windspeeds, current and forecasted rain fall or snowfall, current and forecasted temperatures, current and forecasted barometric pressures, presence and/or likelihood of extreme weather (e.g., heat waves, tornados, hurricanes, heavy snow fall/blizzards, wild fires, torrential rain falls, etc.), and current and forecasted trajectory of storms for any given location.

The weather data server 60 may be operated or managed, for example, by an organization such as the national weather service. Alternatively, the weather data server 60 may collect weather/climate related data from weather stations, news stations, remote connected temperature sensors, connected mobile device database tables, etc.

In another embodiment, the server system 54 includes a grid announcement server 62. The grid announcement server 62 may store data related to the grid power source 20. For example, the grid-related data could include announcements concerning scheduled blackouts and/or other grid-related announcements related to power disruption conditions, the type of energy generation (e.g., coal, natural gas, nuclear, wind turbine, solar, etc.) associated with the grid power source 20, etc. The grid announcement server 62 may be operated or managed by the utility service provider associated with the grid power source 20 at the location of the vehicle 10 and/or the structure 18.

In a first embodiment, a user/owner of the vehicle 10 may interface with the server system 54 using the HMI 50. For example, the HMI 50 may be equipped with an application 64 (e.g., FordPass™ or another similar web-based application) for allowing users to interface with the server system 54. The HMI 50 may be located within a passenger cabin of the vehicle 10 and may include various user interfaces for displaying information to the vehicle occupants and for allowing the vehicle occupants to enter information into the HMI 50. The vehicle occupants may interact with the user interfaces presentable on the HMI 50 via touch screens, tactile buttons, audible speech, speech synthesis, etc.

In another embodiment, the user/owner of the vehicle 10 may alternatively or additionally interface with the server system 54 for coordinating functions of the preemptive vehicle reenergizing system 44 using a personal electronic device 66 (e.g., a smart phone, tablet, computer, wearable smart device, etc.). The personal electronic device 66 may include an application 68 (e.g., FordPass™ or another similar application) that includes programming to allow the user to employ one or more user interfaces 70 for setting or controlling certain aspects of the preemptive vehicle reenergizing system 44. The application 68 may be stored in a memory 72 of the personal electronic device 66 and may be executed by a processor 74 of the personal electronic device 66. The personal electronic device 66 may additionally include a transceiver 76 that is configured to communicate with the server system 54 over the cellular tower(s) 58 or some other wireless link.

The GPS 48 is configured to pinpoint locational coordinates of the vehicle 10. The GPS 48 may utilize geopositioning techniques or any other satellite navigation techniques for estimating the geographic position of the vehicle 10 at any point in time. GPS data from the GPS 48 may be used to determine the weather data that is most relevant to the vehicle 10 at any point in time.

The control module 52 may include both hardware and software and could be part of an overall vehicle control system, such as a vehicle system controller (VSC), or could alternatively be a stand-alone controller separate from the VSC. In an embodiment, the control module 52 is programmed with executable instructions for interfacing with and commanding operation of various components of the preemptive vehicle reenergizing system 44. Although shown as separate modules within the highly schematic depiction of FIG. 2, the telecommunications module 46, the GPS 48, the HMI 50, and the control module 52 could be integrated together as part of common module of the vehicle 10.

The control module 52 may include a processor 78 and non-transitory memory 80 for executing various control strategies and modes associated with the preemptive vehicle reenergizing system 44. The processor 78 may be a custom made or commercially available processor, a central processing unit (CPU), or generally any device for executing software instructions. The memory 80 may include any one or combination of volatile memory elements and/or non-volatile memory elements.

The processor 78 may be operably coupled to the memory 80 and may be configured to execute one or more programs stored in the memory 80 of the control module 52 based on the various inputs received from other devices, such as the server system 54, the telecommunications module 46, the GPS 48, the HMI 50, the energy storage system 12, etc. In an embodiment, the application 64 (e.g., FordPass™ or another similar application), which includes programming for allowing the vehicle user to employ one or more user interfaces within the HMI 50 for setting or controlling certain aspects of the preemptive vehicle reenergizing system 44, may be stored in the memory 80 and may be executed by the processor 78 of the control module 52. Alternatively or additionally, the control module 52 may be configured to communicate and interface with the personal electronic device 66 for coordinating and/or executing certain aspects of the preemptive vehicle reenergizing system 44 through the application 68.

The control module 52 may receive and process various inputs for predicting or detecting power disruption conditions of the grid power source 20 and for commanding one or more preemptive reenergizing alerts in response to the predicted or detected power disruption conditions.

In an embodiment, based at least on inputs from the GPS 48 and the weather data server 60, the control module 52 may predict the potential for a power disruption condition. Predicting the potential for the power disruption condition may include assessing the likelihood of occurrence of a power outage or other disruption associated with the grid power source 20. The control module 52 may be programmed to predict the potential for the power disruption condition based on the likelihood of severe weather at the location of the vehicle 10 and/or the structure 18, how soon the severe weather is predicted to arrive, and/or various other information obtained from the weather data server 60. The prediction may further be based on historical weather logs, storm category information, storm trajectory, etc.

The control module 52 may additionally predict the potential for the power disruption condition based on inputs from the grid announcement server 62. For example, the control module 52 may be programmed to infer the power disruption condition based on scheduled blackout information received from the grid announcement server 62. The control module 52 may be further programmed to detect when an actual power disruption condition occurs based on inputs from the grid announcement server 62.

Once a power disruption condition is predicted or an actual power disruption condition is detected, the control module 52 may analyze various information for determining whether or not the power disruption condition is likely to raise the cost of electricity received from the grid power source 20 by greater than a predefined threshold. In an embodiment, the predefined threshold is defined as a percentage, such as 10%, for example. However, other thresholds could alternatively be defined as the predefined threshold within the scope of this disclosure.

The control module 52 may communicate with a neural network 82 associated with the server system 54 as part of the process for determining whether or not the power disruption condition is likely to raise the cost associated with purchasing electricity from the grid power source 20 by greater than the predefined threshold. The neural network 82 may be configured to receive and process a plurality of different types of data $D_1$-$D_N$, where "N" represents any number. In an embodiment, the data $D_1$-$D_N$ is primarily received from the weather data server 60 and/or the grid announcement server 62. The neural network 82 may be a long short-term memory (LSTM) neural network that provides a framework for machine learning. Specifically, the neural network 82 may be trained to predict an electrical grid response to power disruption conditions and any associated electricity costs on a region-by-region basis based on the various data inputs (i.e., from the data $D_1$-$D_N$). In other words, the neural network 82 may be trained to determine whether a given power disruption condition of the grid power source 20 is likely to raise electricity costs within a specific geographic region and by how much.

In an embodiment, when the power disruption condition is predicted as being likely to raise the cost of electricity received from the grid power source 20 by greater than the predefined threshold, the control module 52 may command that one or more preemptive reenergizing alerts be communicated to the user/owner of the vehicle 10. The preemptive reenergizing alerts inform the user that it may be in his/her best interest to reenergize (e.g., refuel or recharge) the vehicle 10 as soon as possible.

The preemptive reenergizing alerts may take the form of one or more messages that can be displayed on the HMI 50 or the personal electronic device 66, for example. The messages may include instructions to charge/refuel the vehicle 10 as soon as possible, instructions to limit energy consumption until the power disruption condition has passed, information regarding when the power disruption condition is likely to take effect, when the power disruption is likely to pass, and how long the effects of the disruption are likely to last, estimates related to the potential rise in costs associated with reenergizing the vehicle 10, etc.

In another embodiment, when the power disruption condition is predicted as being likely to raise the cost of electricity received from the grid power source 20 by greater than the predefined threshold and the vehicle 10 is expected to be used as a source of energy for powering the structure 18, the control module 52 may calculate the minimum amount of energy that must be stored within the energy storage system 12 of the vehicle 10 for supporting the electrical loads of the structure 18. The minimum amount of energy may be calculated based on inputs such as distance to nearest charging location, typical energy consumption per distance unit of the vehicle 10, anticipated energy consumption per time unit of the structure 18, expected duration of power disruption condition, etc.

In another embodiment, if the vehicle 10 is an electrified vehicle and is already charging or connected to an EVSE system when the preemptive reenergizing alert is communicated, the control module 52 may command charging of the vehicle 10 to the required minimum amount of energy, or to a 100% state of charge (SOC) if time permits, as fast as possible. In situations where the vehicle 10 is being charged and the grid energy demand increases, a brown out occurs, a cost surge occurs, or rolling power outage occurs, the control module 52 may be configured to command various actions of the vehicle 10, including but not limited to stopping charging, returning energy to the grid power source 20, charging at a reduced rate, pausing charging, etc.

In yet another embodiment, if the vehicle 10 is an autonomous vehicle and the power disruption condition is predicted as being likely to raise the cost of electricity received from the grid power source 20 by greater than the predefined threshold, the control module 52 may command the vehicle 10 to automatically drive itself to the nearest recharging/refueling station and reenergize as needed.

Figure 3:
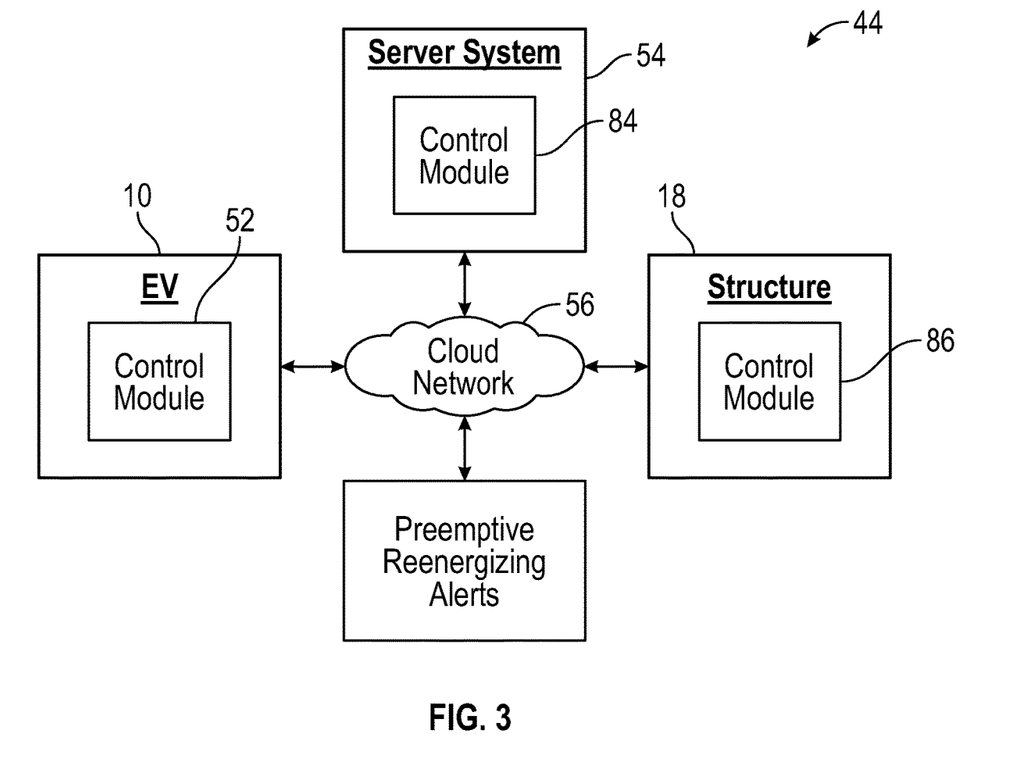
FIG. 3 schematically illustrates another exemplary preemptive vehicle reenergizing system.

In the embodiments described above, the control module 52 of the vehicle 10 may be configured to function as the communications hub of the preemptive vehicle reenergizing system 44. However, other embodiments are also contemplated within the scope of this disclosure. For example, as shown in FIG. 3, a control module 84 of the server system 54 (e.g., a cloud-based control module) and/or a control module 86 associated with the structure 18 could be configured to function as the communications hub of the preemptive vehicle reenergizing system 44. In yet another embodiment, the respective control modules of each of the vehicle 10, the structure 18, and the server system 54 may operate together over the cloud network 56 to establish a control system for controlling the functionality of the preemptive vehicle reenergizing system 44, such as for predicting when power disruption conditions are likely to raise the cost of electricity by greater than the predefined threshold and then commanding the preemptive reenergizing alerts in response to the predicting, for example.

Figure 4:
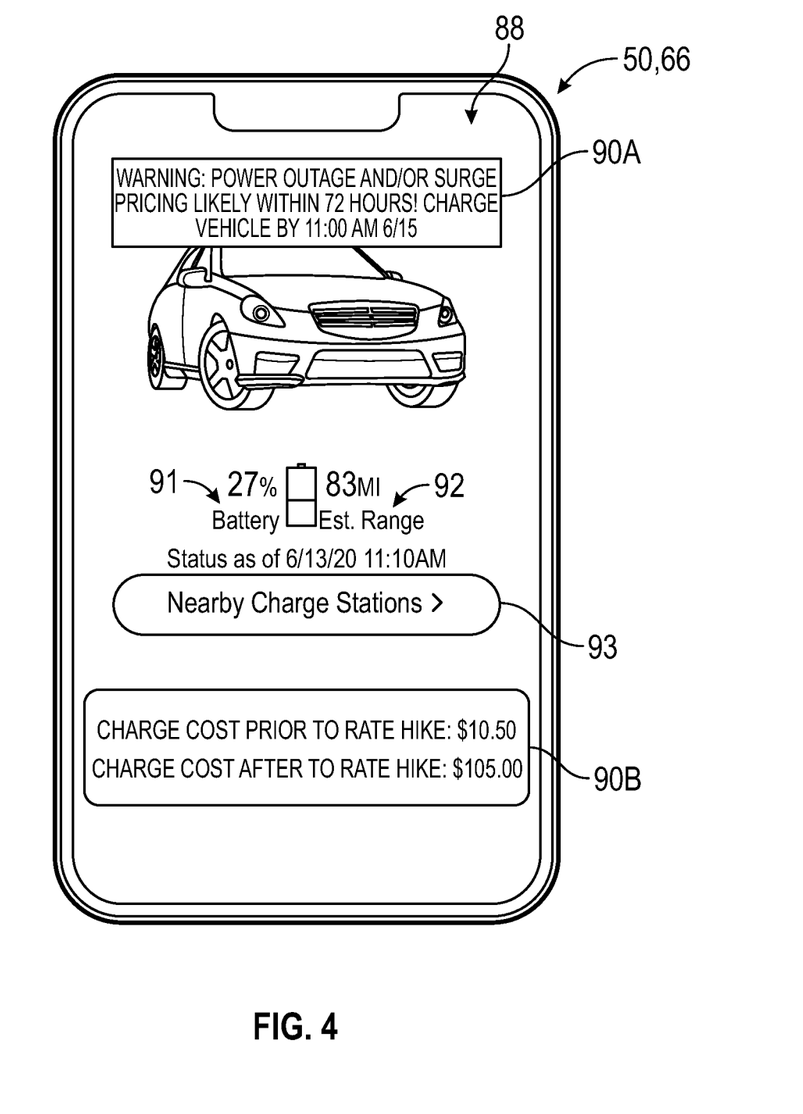
FIG. 4 illustrates an exemplary user interface configured for presenting preemptive reenergizing alerts to a vehicle user.

An exemplary user interface 88 that can be presented to the user on the HMI 50 or the personal electronic device 66 for communicating the preemptive reenergizing alerts is schematically illustrated in FIG. 4. The preemptive reenergizing alerts may be presented to the user on the user interface 88 in the form of various prompts or messages. In an embodiment, the preemptive reenergizing alerts include a first message 90A that indicates that a power disruption condition is likely within an upcoming period of time and that the user should consider charging his/her vehicle by a certain time, and a second message 90B may convey cost information associated with reenergizing the vehicle 10 both before and after the power outage condition begins. The user interface 88 may present the user with various other information, including but not limited to, a current energy state 91 (e.g., state of charge of battery or fuel level of fuel tank) of the energy storage system 12, a current travel range 92 of the vehicle 10, and a link 93 to nearby charging stations.

Figure 5:
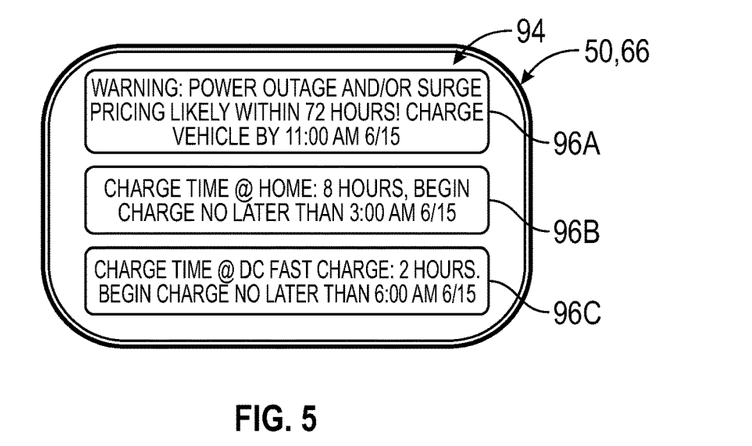
FIG. 5 illustrates another exemplary user interface configured for presenting preemptive reenergizing alerts to a vehicle user.

Another exemplary user interface 94 that can be presented to the user on the HMI 50 or the personal electronic device 66 for communicating the preemptive reenergizing alerts is schematically illustrated in FIG. 5. In this embodiment, the preemptive reenergizing alerts may include a first message 96A that indicates that a power disruption condition is likely within an upcoming period of time and that the user should consider charging his/her vehicle by a certain time, a second message 96B that presents charging time information for charging at the structure 18, and a third message 96C that presents charging time information for charging the vehicle 10 at a DC fast charging station.

Figure 6:
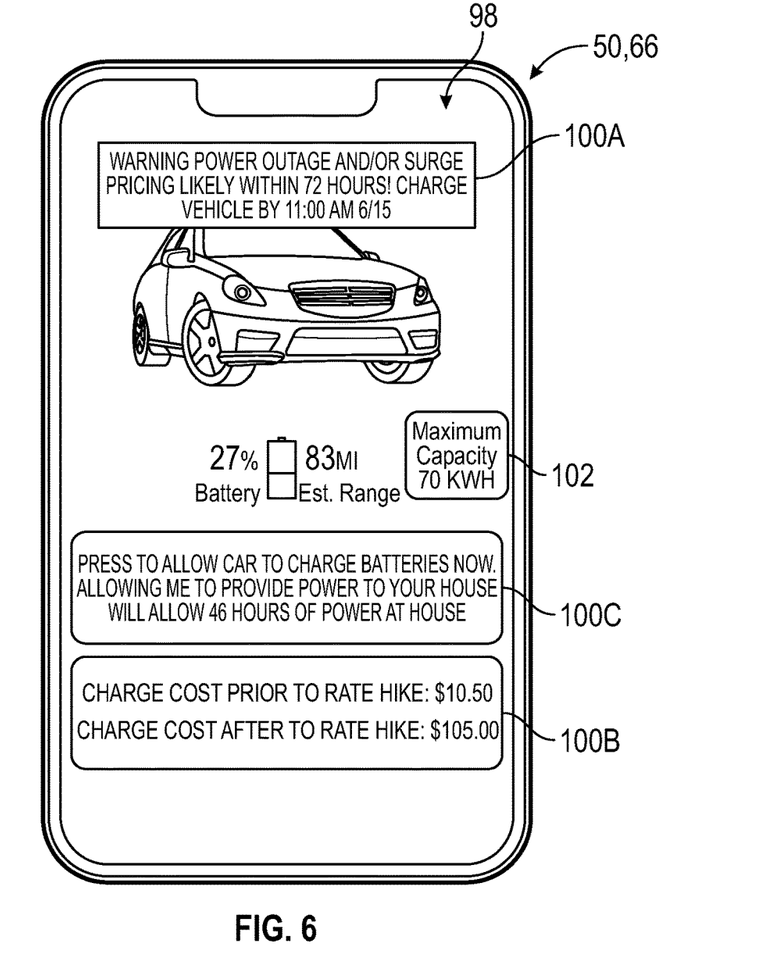
FIG. 6 illustrates yet another exemplary user interface configured for presenting preemptive reenergizing alerts to a vehicle user.

Yet another exemplary user interface 98 that can be presented to the user on the HMI 50 or the personal electronic device 66 for communicating the preemptive reenergizing alerts is schematically illustrated in FIG. 6. In this embodiment, the preemptive reenergizing alerts may include a first message 100A that indicates that a power disruption condition is likely within an upcoming period of time and that the user should consider charging his/her vehicle by a certain time, a second message 100B that conveys costs associated with reenergizing the vehicle 10 both before and after the power disruption condition begins, and a third message 100C that indicates the amount of time the vehicle 10 can be used to power the structure 18 should the vehicle 10 be charged to its full capacity. The third message 100C may be part of a tactile button that may be pressed by the user to initiate charging of the vehicle 10, such as when the vehicle 10 is an autonomous vehicle, for example. The user interface 98 may present the user with various other information, including but not limited to, maximum charging capacity 102 of the energy storage system 12 of the vehicle 10.

Figure 7:
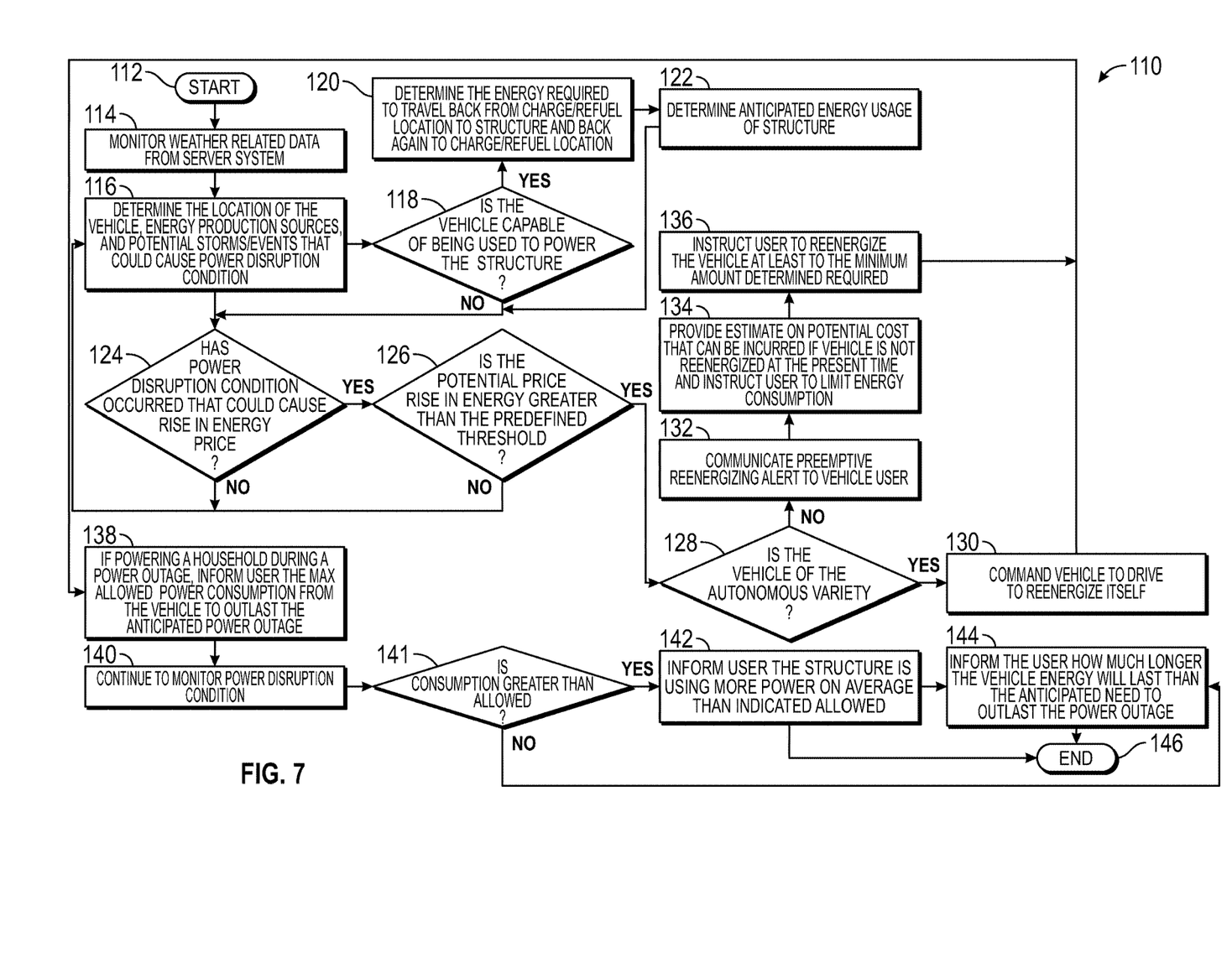
FIG. 7 is a flow chart of an exemplary method for providing preemptive reenergizing alerts in response to predicted power disruption conditions.

FIG. 7, with continued reference to FIGS. 1-6, schematically illustrates in flow chart form an exemplary method 110 for coordinating and providing preemptive reenergizing alerts to the user of the vehicle 10. The preemptive vehicle reenergizing system 44 may be configured to employ one or more algorithms adapted to execute at least a portion of the steps of the exemplary method 110. For example, the method 110 may be stored as executable instructions in the memory 80 of the control module 52, and the executable instructions may be embodied within any computer readable medium that can be executed by the processor 78 of the control module 52. The method 110 could alternatively or additionally be stored as executable instructions in the memories of the control module 84 of the server system 54 and/or the control module 86 of the structure 18.

The exemplary method 110 may begin at block 112. At block 114, the method 110 may monitor various weather related data from the server system 54. The monitoring may include monitoring current and historical weather data from the weather data server 60, for example.

Next, at block 116, the method 110 may determine the location of the vehicle 10, the relevant energy production sources at the location (e.g., coal power plant, natural gas powerplant, nuclear, wind turbine, solar power, etc.), and the potential weather related events that could case power disruption conditions at or near the location of the vehicle 10. This step may include analyzing data from both the weather data server 60 and the grid announcement server 62, for example.

At block 118, the method 110 may determine whether the vehicle 10 is equipped to supply power to the structure 18 should a power disruption condition occur. If YES, the method 110 may determine the amount of energy required for the vehicle 10 to travel to the structure 18 from a nearby charging/refueling station and then back again to the nearby charging/refueling station at block 120. The method 110 may further determine the anticipated energy usage of the structure 18 for an upcoming time period at block 122.

The method 110 may proceed to block 124 either directly from block 122 or when a NO flag is returned at block 118. At block 124, the method 110 may determine whether a power disruption condition has occurred that has the potential to raise the price of energy (e.g., electricity or fuel). If YES, the method 110 may subsequently determine, at block 126, whether the power disruption condition is likely to raise the energy cost by an amount that is greater than the predefined threshold (e.g., 10%).

The method 110 may proceed to block 128 when block 126 results in a YES flag. At this step, the method 110 may determine whether the vehicle 10 is an autonomous vehicle. The vehicle 10 may then be commanded to drive itself to the nearest reenergizing location at block 130 if the vehicle 10 has autonomous capabilities.

The method 110 may proceed to block 132 rather than block 130 if the vehicle 10 is not of the autonomous variety. At block 132, the preemptive reenergizing alerts may be communicated to the user of the vehicle 10. The alerts may come in the form of one or more messages that may be presented on a user interface of the HMI 50 and/or the personal electronic device 66.

At block 134, the method 110 may provide the user with an estimated cost associated with reenergizing the vehicle 10 both before and after the likely power disruption event and may further instruct the user to limit energy consumption. The method 110 may then instruct the user to reenergize the vehicle 10 at least to an predetermined minimum amount at block 136.

The method 110 may, at block 138, inform the user of the maximum power consumption allowed from the vehicle 10 in order to outlast the anticipated power disruption condition. The power disruption condition is continued to be monitored at block 140.

At block 141, the method 110 may determine whether the power consumption from the vehicle 10 is greater than is allowed to ensure that the power outlasts the anticipated power disruption condition. If YES, the method 110 may inform the user that the structure 18 is using more power than indicated as being allowed at block 142. If NO, the method 110 may inform the user that the structure 18 is using less power than indicated as being allowed and may further inform the user how much longer the vehicle 10 can be used to power the structure 18 at block 144. The method 110 may end at block 146.

The preemptive vehicle reenergizing systems of this disclosure are designed to coordinate preemptive reenergizing alerts for apprising users of potential power disruption events that can cause energy costs to rise above acceptable thresholds. The proposed systems/methods thus provide added value to vehicle owners and ensure a better overall understanding of how to optimize energy consumption from the vehicle during the power disruption conditions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A preemptive vehicle reenergizing system, comprising:
an energy storage system; and
a control module programmed to command an alert for reenergizing the energy storage system in response to predicting that a power disruption condition of a grid power source is likely to raise a cost of energy purchased from the grid power source by greater than a predefined threshold,
wherein the predefined threshold is defined as a percentage increase of the cost,
wherein the alert includes a first estimated cost associated with reenergizing the energy storage system before the power disruption condition takes effect and a second estimated cost associated with reenergizing the energy storage system after the power disruption condition takes effect.

2. The system as recited in claim 1, wherein the energy storage system includes a traction battery pack or a fuel tank system.

3. The system as recited in claim 1, wherein the control module is programmed to predict that the power disruption condition is likely based on weather related data received from a weather data server.

4. The system as recited in claim 1, wherein the control module is programmed to predict that the power disruption condition is likely based on data received from a grid announcement server associated with the grid power source.

5. The system as recited in claim 1, wherein the control module is a component of a motor vehicle that is powered by the energy storage system.

6. The system as recited in claim 1, wherein the control module is programmed to communicate with a neural network for determining whether the power disruption condition is likely to raise the cost of the energy by greater than the predefined threshold.

7. The system as recited in claim 1, wherein the percentage is at least 10%.

8. The system as recited in claim 1, wherein the alert for reenergizing the energy storage system includes one or more messages presented on a human machine interface (HMI) or a personal electronic device associated with the preemptive vehicle reenergizing system.

9. The system as recited in claim 8, wherein the one or more messages includes an instruction to reenergize the energy storage system, an estimate of when the power disruption condition is likely to take effect, or an estimate of how long the power disruption condition is likely to last.

10. A method, comprising:
    predicting, via a control module of a preemptive vehicle reenergizing system, when a power disruption condition is likely to raise a cost of energy purchased from a grid power source by greater than a predefined threshold, wherein the predefined threshold is defined as a percentage increase of the cost; and
    communicating an alert for reenergizing a vehicle energy storage system in response to the predicting,
    wherein communicating the alert includes displaying a message to a user on a human machine interface or a personal electronic device that is operably linked to the preemptive vehicle reenergizing system,
    wherein displaying the message includes indicating a first estimated cost associated with reenergizing the vehicle energy storage system before the power disruption condition takes effect and indicating a second estimated cost associated with reenergizing the vehicle energy storage system after the power disruption condition takes effect.

11. The method as recited in claim 10, wherein the control module is a component of a motor vehicle associated with the preemptive vehicle reenergizing system.

12. The method as recited in claim 10, wherein the predicting includes:
    receiving weather related data from a weather data server; and
    predicting whether the power disruption condition is likely based on the weather related data.

13. The method as recited in claim 12, wherein the predicting includes:
    communicating with a neural network for determining whether the power disruption condition is likely to raise the cost of the energy by greater than the predefined threshold.

14. The method as recited in claim 10, wherein the predicting includes:
    receiving data from a grid announcement server associated with the grid power source; and
    predicting whether the power disruption condition is likely based on the data from the grid announcement server.

15. The method as recited in claim 10, comprising:
    commanding an autonomous vehicle associated with the preemptive vehicle reenergizing system to drive to a nearby charging/refueling station when the power disruption condition is likely to raise the cost of the energy by greater than the predefined threshold.

16. The method as recited in claim 10, wherein the message includes an estimate of when the power disruption condition is likely to take effect and how long the power disruption condition is likely to last.

17. A method, comprising:
    predicting, via a control module of a preemptive vehicle reenergizing system, when a power disruption condition is likely to raise a cost of energy purchased from a grid power source by greater than a predefined threshold, wherein the predefined threshold is defined as a percentage increase of the cost; and
    commanding an autonomous vehicle associated with the preemptive vehicle reenergizing system to automatically drive itself to a nearby charging/refueling station when the power disruption condition is likely to raise the cost of the energy by greater than the predefined threshold.

* * * * *